United States Patent [19]
Ayers, Jr. et al.

[11] 3,937,523
[45] Feb. 10, 1976

[54] PROPORTIONING BRAKE CONTROL DEVICE WITH BYPASS

[75] Inventors: David T. Ayers, Jr., Birmingham; Roger E. Doerfler, Detroit; William Stelzer, Milford, all of Mich.

[73] Assignee: Kelsey-Hayes Company, Romulus, Mich.

[22] Filed: Nov. 29, 1974

[21] Appl. No.: 528,475

Related U.S. Application Data
[63] Continuation of Ser. No. 393,132, Aug. 30, 1973, abandoned.

[52] U.S. Cl. ............................... 303/6 C; 188/349
[51] Int. Cl.² .......................................... B60T 13/00
[58] Field of Search....... 303/6 C, 6 R, 84; 188/349, 188/151 A; 137/110

[56] References Cited
UNITED STATES PATENTS

| | | |
|---|---|---|
| 3,314,235 | 4/1967 | Stelzer ........................... 303/6 C X |
| 3,480,333 | 11/1969 | Stelzer ........................... 303/6 C |
| 3,586,384 | 6/1971 | Falk ................................ 303/6 C |
| 3,695,730 | 10/1972 | Ayers, Jr. ........................ 303/6 C |
| 3,708,211 | 1/1973 | Bueler ............................ 303/6 C |
| 3,727,987 | 4/1973 | Shellhause ..................... 303/6 C |
| 3,737,603 | 6/1973 | Kish et al. ..................... 303/6 C X |
| 3,768,869 | 10/1973 | Bueler et al. .................. 303/6 C |
| 3,817,584 | 6/1974 | Huston et al. ................. 303/6 C |

*Primary Examiner*—Trygve M. Blix
*Assistant Examiner*—Douglas C. Butler

[57] ABSTRACT

A device for varying the proportion of brake pressure delivered to the front and rear brakes of a vehicle, and including a differential area piston for decreasing the proportion delivered to the rear brakes between the first and second inlet pressures, and an additional valve assembly actuatable in response to a predetermined pressure differential between the fluid pressure delivered to the piston and the fluid pressure delivered thereby to the rear brakes so as to establish a decreasing pressure differential between the pressure delivered to the front and rear brakes.

31 Claims, 4 Drawing Figures

PROPORTIONING BRAKE CONTROL DEVICE WITH BYPASS

CROSS REFERENCE TO RELATED PATENTS

This is a continuation of application Ser. No. 393,132, filed Aug. 30, 1973, now abandoned.

Present invention is related generally to the invention disclosed in U.S. Pat. No. 3,695,730, issued Oct. 3, 1972, and assigned to the assignee of this application.

BACKGROUND AND SUMMARY OF THE INVENTION

1. The field of the invention

Proportioning devices for vehicle hydraulic brake systems.

2. Description of the Prior Art

It is well known that the proportion of a vehicle's weight that is borne by the front and rear wheels of the vehicle changes as the vehicle is braked. In particular, during the braking operation, the weight borne by the rear wheels of a vehicle decreases while the weight borne by the front wheels increases. The change in weight is dependent upon the magnitude of the deceleration of the vehicle, and in recognition of this phenomena, various proportioning devices or valves have heretofore been proposed that are responsive to master cylinder outlet pressure and which serve to limit the brake pressure applied to the rear wheels upon attainment of a predetermined master cylinder outlet pressure. In the event of a front line failure or extreme brake fade at the rear wheels, it has also heretofore been proposed to bypass the proportioning device so that the brake pressure delivered to the brakes at the rear wheels is not in any way inhibited, thus assuring that the rear brakes have adequate line pressure to stop the vehicle.

In the design of vehicular brake systems, the front and rear brake systems are designed to reach a point of lock-up at some predetermined pressure ratio. In the case where a vehicle brake system incorporates disc-type brakes on the front wheels and drum brakes on the rear wheels, a typical "lock-up" point might be approximately 1200 PSI at the front brakes and approximately 800 PSI at the rear brakes. Due to the difference in fade characteristics between disc and drum type brakes (drum type brakes tending to fade at a considerably faster rate than disc brakes), under prolonged braking conditions which result in brake fade, the fluid pressure at which the rear brakes will lock up is considerably greater than the fluid pressure at which the front wheel disc brakes will lock up under the same braking conditions. Consequently, it is desirable that a decreasing offset or pressure differential between the pressures delivered to the front and rear brakes is established above the normal pressure at which the proportioning valve performs its proportioning or fluid modulation operation, whereby to achieve, at a predetermined rate, equalization of the fluid pressure delivered to the front and rear brakes. It is accordingly a general object of the present invention to provide a new, improved proportioning device which is adapted to be inserted between the master cylinder and a rear brake cylinder of a vehicular braking system for controlling the brake pressure applied to the rear wheels above a first predetermined master cylinder outlet pressure, and additional means is provided for controlling the pressure differential between the pressures delivered to the front and rear brakes above a second predetermined brake fluid inlet pressure, whereby to accommodate for the differential fade characteristics between the front and rear brakes of the vehicle.

It is another object of the present invention to provide a new and improved proportioning device, as above described, that may be operatively associated with a bypass valve arrangement which functions to communicate master cylinder pressure directly to the rear brake cylinders in the event of a failure of the front brakes of the associated vehicle.

It is another object of the present invention to provide a new and improved proportioning device, as above described, that is adapted to utilize readily available components, which is simple in operation and will have a long and effective operational life.

Other objects and advantages of the present invention will become apparent from the following detailed description taken in conjunction with the accompanying drawings.

BRIEF DESCRIPTION OF THE DRAWINGS

FIG. 4 is an enlarged fragmentary view of a portion of the proportioning device shown in FIG. 1.

DETAILED DESCRIPTION OF THE PREFERRED EMBODIMENTS

Figure 1:
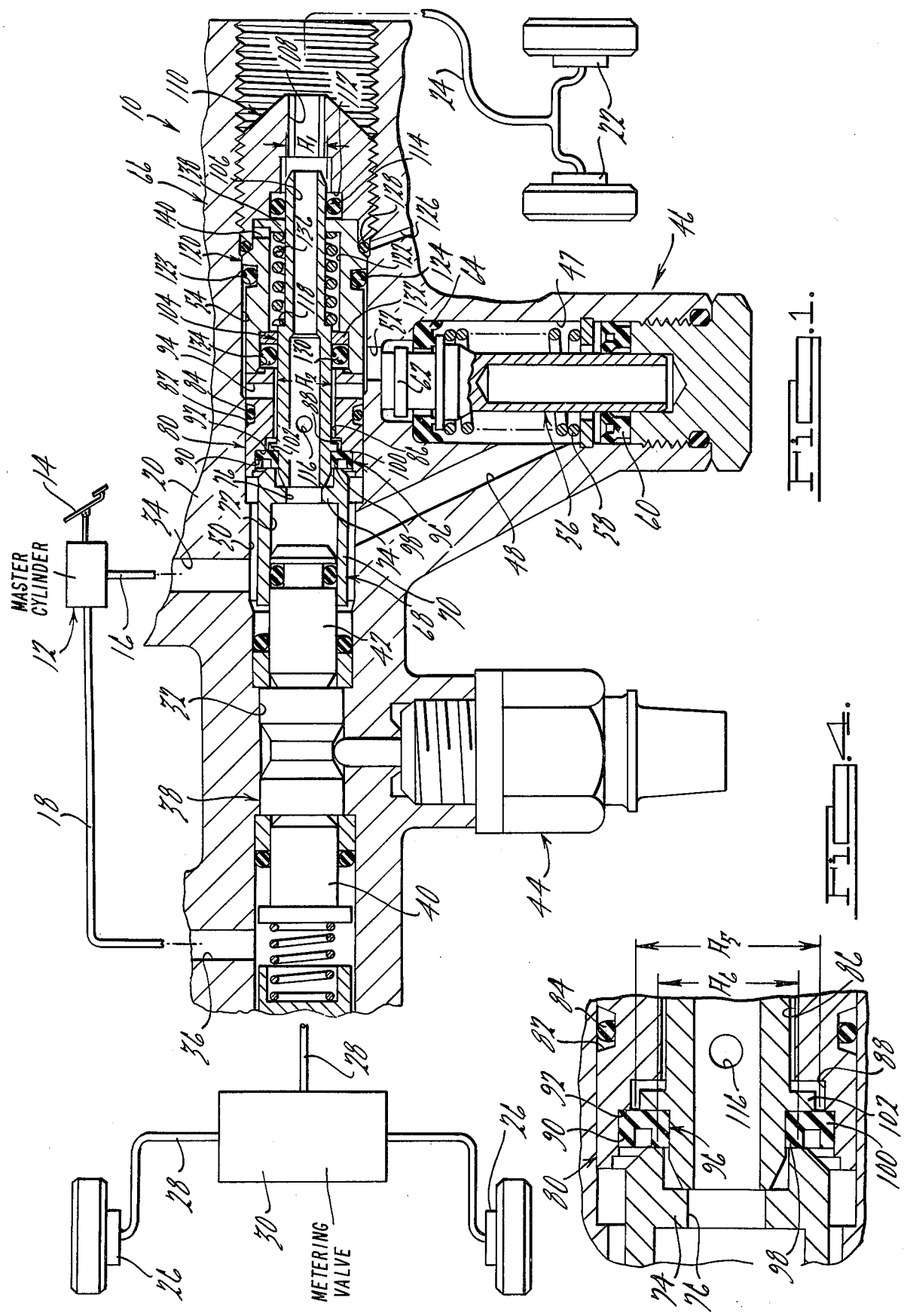
FIG. 1 is a cross sectional view of a proportioning device according to the principles of the present invention.

Referring now in detail to the drawings and in particular to FIG. 1 thereof, a brake control device 10, in accordance with one preferred embodiment of the present invention, is shown generally in operative association with a dual master brake cylinder 12 of an associated vehicular brake system, the master cylinder 12 being actuable in a conventional manner by means of a suitable foot-operated brake pedal 14. The master cylinder 12 is connected to the control device 10 by means of supply conduits 16 and 18 which are communicable in the manner hereafter to be described with the housing 20 of the control device 10. The associated brake system includes a pair of rear wheel drum brake cylinders, representatively designated by the numeral 22, which are communicable via conduit 24 with the housing 20. Additionally, the brake system includes a pair of front wheel brake cylinders, generally designated by the numeral 26, which are typically of the disc type and are communicable with the housing 20 by means of suitable conduits 28. In order to accommodate for the braking pressure required to actuate the disc brakes at the front wheels of the vehicle and the drum brakes at the rear wheels of the vehicle, the control device 10 may be provided with a metering valve assembly, representatively designated by the numeral 30, and which is preferably of the construction and operation of the metering valve shown in U.S. Pat. No. 3,480,333, issued Nov. 25, 1969, and assigned to the assignee of this application, which patent is incorporated by reference in the descriptive portion of this specification.

Referring now in detail to the control device 10, as shown in FIG. 1, the housing 20 is provided with an elongated longitudinally extending bore, generally designated by the numeral 32 and communicable at the opposite ends thereof with the conduits 24, 26. The bore 32 is also communicable via lateral fluid passages 34 and 36 with the conduit 16 and 18 and hence with the master cylinder 12. Disposed within the bore 32 is a detent member, generally designated by the numeral 38, that is disposed interjacent a pair of longitudinally slidable piston members 40 and 42 and is cooperable with an electrical indicating switch 44. As described in the aforementioned U.S. Pat. No. 3,480,333, the switch 44 is operable to provide an indication of a failure in either the front or rear brake systems of the associated vehicle which results in a differential pressure condition within the bore 32 at the opposite ends of the pistons 40, 42. In the event of a failure of either of the brake systems, the detent member 38 will be biased longitudinally within the bore 32, resulting in actuation of the electrical switch 44, as described in detail in the aforementioned U.S. Pat. No. 3,480,333.

The brake control device 10 includes a proportioning valve assembly, generally designated by the numeral 46, which is disposed within a proportioning valve chamber 47 arranged at generally right angles to the axis of the bore 32. The valve assembly 46 is preferably of a construction and operation similar to the proportioning valve shown in U.S. Pat. No. 3,423,936, issued Jan. 28, 1969, and assigned to the assignee of this application, which patent is also incorporated by reference in the descriptive portion of this specification. While a detailed understanding of the operation and construction of the proportioning valve assembly 46 can be obtained from the aforementioned U.S. Pat. No. 3,423,936, briefly, the valve assembly 46 is constructed and operates as follows.

As shown in FIG. 1, the chamber 47 is communicable via an upwardly inclined fluid flow passage 48 with a counterbore 50 formed around the interior of the bore 32, which counterbore 50 communicates the inlet passage 34 with the passage 48. The upper end of the chamber 47 is communicable via an upwardly extending fluid flow passage 52 with another counterbore 54 formed around the interior of the bore 32. Disposed interiorly of the chamber 47 is a generally vertically reciprocable piston member 56 which is acted upon by means of a helical coil spring 58 that extends around the piston 56. A fluid seal 60 is disposed circumjacent the lower end of the piston 56, while the upper end thereof is provided with a valve head 62 which is cooperable with an annular valve member 64 disposed within the upper end of the chamber 47. The proportioning valve assembly 46 normally provides a fluid path between the passages 48 and 52 until the fluid pressure delivered to the housing 20 from the master cylinder 12 attains a predetermined level. At that time, the valve head 62 will close against the valve member 64. The level of pressure at which this occurs is dependent upon the force of the spring 58 compared to the effective areas of the piston 56 acted upon by the pressure in the passage 48 and the pressure in the passage 52. During the lower ranges of applied brake effort, the pressures acting on the piston produce a downward force on the piston 56 which is insufficient to overcome the force of the spring 58; however, as the pressures increase, the valve head 62 will close against the valve member 64. After the valve head thus closes, the fluid pressure in the passage 48 will be increased by the master cylinder 12, and the increased level of fluid pressure will act against the piston 56 in a manner so as to produce an upwardly directed force on the piston 56 assisting the spring 58 and tending to reopen or move the valve head 62 away from the valve member 64 to deliver at least a portion of this increased fluid pressure to the passage 52 and hence to the rear brakes of the associated vehicle. The piston 56 will continue to modulate and thus proportion the flow of fluid to the rear brakes of the vehicle as the master cylinder pressure continues to increase, and the ratio of the pressures is determined by the relationship of the areas on the piston 56 which are exposed to the fluid pressures in the passages 48 and 52.

In accordance with the principles of the present invention, the brake control device 10 is provided with an additional valve assembly, generally designated by the numeral 66, which is disposed within the bore 32 of the housing 20 directly above the proportioning valve assembly 56. The valve assembly 66 includes an annular spool member 68 which comprises a generally cylindrically shaped body 70 that is coaxially located within the bore 32 at a position in general longitudinal alignment with the counterbore 50 and is spaced generally radially inwardly therefrom. The spool member 68 is formed with a central bore 72 which is partially closed at the right end thereof by means of a radial wall 74 defining a reduced diameter central bore 76. As illustrated, the piston 42 is slidably disposed within the bore 72 and is intended to function in a manner hereinafter to be described in providing a bypass by which fluid may be communicated directly from the passage 34 to the outlet of the control device 10, thereby circumventing or bypassing the proportioning valve assembly 46 in the event of a failure in the front wheel brakes of the associated brake system.

The valve assembly 66 also comprises an annular sleeve member, generally designated by the numeral 80, which is disposed within the bore 32 directly adjacent the right end of the spool member 68. The sleeve member 80 is formed with an annular recess 82 around the outer periphery thereof within which an o-ring sealing member 84 is disposed, the sealing member 84 providing a fluid-tight seal between the inner periphery of the bore 32 and the outer periphery of the sleeve member 80, as will be apparent. The sleeve member 80 is formed with a central bore 86 located coaxially of the bore 32 and which is in turn formed with first and second annular counterbores 88 and 90 that define a radial face 92 therebetween. The sleeve member 80 is also formed with one or more generally radially extending bores 94 which communicate the interior thereof with the counterbore 54 for purposes hereinafter to be described.

Disposed directly adjacent the radial face 92 is an annular cup-like seal, generally designated by the numeral 96. The seal 96 has a first portion 98 which is engageable with the adjacent end of the spool member 68 and another portion 100 which is engageable with the radial face 92 and with a generally radially outwardly extending annular shoulder 102 formed around the outer periphery of an elongated hollow cylindrical piston member, generally designated by the numeral 104, which is longitudinally reciprocally disposed within the bore 32 and in particular, within the sleeve member 80. As shown, the piston member 104 is disposed coaxially of the bore 32 and is formed with an elongated central bore 106 which extends the entire length thereof and communicates the interior of the bore 72 of the spool member 68 with an outlet passage 108 defined in an end fitting 110 suitably mounted within the right end of the housing 20. The passage 108 is formed with a counterbore 112 within which an o-ring sealing member 114 is disposed, the sealing member 114 providing a fluid-tight seal between the inner periphery of the counterbore 112 and the outer periphery of the adjacent end of the piston member 104. The opposite (left) end of the piston member 104 is formed with at least one radially extending bore or passage 116 communicating the central bore 106 thereof with the central bore 86 of the sleeve member 80. At a position generally intermediate the opposite ends thereof, the piston member 104 is formed with a generally radially extending shoulder 118 which functions in a manner hereinafter to be described.

Disposed adjacent the right end of the sleeve member 80 is a second annular sleeve member, generally designated by the numeral 120. The member 120 is formed with a central bore 122 within which the adjacent portion of the piston member 104 is slidably received. The outer periphery of the sleeve member 120 is formed with an annular recess 123 within which an o-ring sealing member or the like 124 is disposed, the member 124 sealingly engaging the inner periphery of the counterbore 54. Directly adjacent the sealing member 124, the housing 20 is formed with a vent passage 126 which communicates at its outer end with the atmosphere and at the inner end with an o-ring valve element 128. The valve element 128 normally closes the vent passage 126 but is movable a sufficient amount to permit the interior of the bore 32 to be communicable with the atmosphere.

Disposed directly adjacent the right end of the sleeve member 80 is an annular o-ring sealing element 130 which is adapted to sealingly engage the outer periphery of the piston member 104 the sealing member 130 being directly adjacent an annular retaining ring 132, with both the ring 132 and the sealing member 130 being located within an annular counterbore 134 formed in the left end of the sleeve member 120. Arranged circumjacent the right end of the piston member 104 is a helical coil spring, generally designated 136, which has the left end thereof bearing against the shoulder 118 of the piston member 104. The opposite (right) end of the spring 136 bears against a generally radially inwardly extending shoulder 138 formed at the right end of the sleeve member 120. An annular crossbore or passage 140 is formed in the sleeve member 120 directly adjacent the shoulder 138 and communicates the interior thereof with the portion of the bore 32 adjacent the member 128 and vent passage 126. As will hereinafter be described in detail, the spring 136 normally functions to resiliently urge the piston member 104 toward a position wherein the shoulder 102 sealingly engages the sealing member 96, thus blocking a fluid flow path from the inlet passage 34, counterbore 50, around the sealing member 96, counterbore 86 and bore 106 to the outlet passage 108. When the piston member 104 is thus sealingly engaged with the sealing member 96, a flow path is provided from the outlet passage 52 of the proportioning valve chamber 47 to the counterbore 54. From the counterbore 54, fluid is free to flow through the radial bore 94 of the sleeve member 80 into the bore 86 defined interiorly thereof. From the bore 86, fluid may flow through the bore 116 in the piston member 104 and then longitudinally along the bore 106 to the outlet passage 108 and thereafter to the rear brake system.

Figure 3:
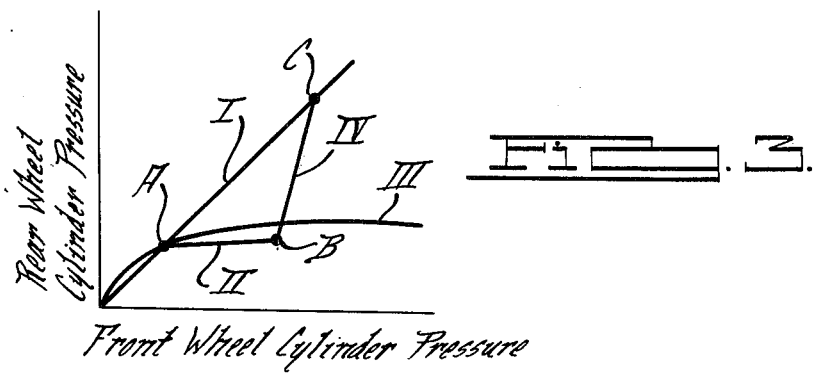
FIG. 3 is a graph illustrating the proportioning of the brake pressure to the front and rear wheels provided by the devices shown in FIGS. 1 and 2.

With reference to FIG. 3, the axis of the abscissa indicates front wheel cylinder pressure, while the axis of the ordinate indicates rear wheel cylinder pressure. With the brakes released, pressure will be at zero (the intersection of the abscissa and ordinates), and upon the generation of braking pressure due to depression of the pedal 14 and actuation of the master cylinder 12, pressure increases occur equally in the front and rear wheel at a 1:1 ratio, as indicated by the line I in FIG. 3, up to the point A at which time the proportioning valve assembly 46 closes. From point A to point B in FIG. 3, the relationship between the front and rear wheel cylinder pressures changes progressively, as indicated by the line II between points A and B in FIG. 3. It will be noted that the rate of increase in pressure in the front wheel cylinders is substantially greater than the rate of increase in pressure in the rear wheel cylinders. Line III in FIG. 3 indicates the front and rear wheel cylinder pressures under an ideal braking operation, and the control device 10 of the present invention is intended to approximate such ideal distribution.

Referring now in detail to the overall operation of the brake control device 10 of the present invention, and in particular, to the operation of the device as graphically depicted between the points B and C in FIG. 3, the components of the device 10 normally occupy their respective positions shown in FIG. 1, that is, when the brake pedal 14 is released. The brakes are applied by depressing the pedal 14 to operate the master cylinder 12 which results in fluid flow through the conduits 16, 18 into the passages 34, 36, respectively. With regard to the flow to the front wheel brake cylinders 26, the fluid from the passage 36 is communicated to the cylinders 26 via the conduits 28 and/or any metering valve assembly, such as the assembly 30, which may be provided in the brake system. Fluid which is introduced into the passage 34 will follow a route through the counterbore 50, passage 48 and be proportioned by the proportioning valve assembly 46, and the proportioned fluid will be communicated via the passage 52 into the counterbore 54. This fluid, as above described, will then follow a flow path to the discharge or outlet passage 108 and be communicated via the conduits 24 to the rear wheel brake cylinders 22. As previously mentioned, up to point A, the brake cylinder pressures, both front and rear, will increase at a 1:1 ratio. Thereafter, the ratio of the pressures communicated to the front and rear brake cylinders will be as indicated along the line II in FIG. 3 to the point B. At point B, the pressures acting on the piston member 104 will result in the member 104 being biased to the right against the resistance of the spring 136. When this occurs, a flow path is provided from the counterbore 50, around the sealing member 96 and into the bore 106 of the piston member 104, from where fluid is communicated directly to the outlet passage 108, thus circumventing the proportioning valve assembly 46. The piston member 104 will thereafter result in a fluid modulation of the brake pressures from the point B to the point C in FIG. 3 in a manner hereinafter to be described.

Prior to initiation of a proportioning cycle, when the piston member 104 is disposed in its closed position shown in FIG. 1, the pressure in the passage 34 leading from the master cylinder 12, herein represented as $P_I$, acts upon an area $A_2$ which is the crosssectional area of the piston member 104 at the position designated in FIG. 1. Assuming that the pressure at the outlet of the valve 56, i.e., in passage 52, is represented as $P_{pr}$, the effective area exposed to the pressure $P_{pr}$ is the difference between the areas $A_2$ and $A_1$ and is represented as $A_4$. The area acted upon by the difference in pressure between $P_I$ and $P_{pr}$ is represented as the area $A_3$ which is defined as the difference between $A_5$ and $A_6$, where $A_5$ is the area defined by the effective diameter of the seal 96 engaging the shoulder 102 and $A_6$ is the area defined by the mean sealing diameter of the seal 96 engaging the adjacent end of the spool member 68 (see FIG. 4).

Assuming that the master cylinder pressure at point A is equal to $P_{s1}$ and that the proportioned pressure in passage 52 at point B is equal to $P_{s2}$, i.e., $P_{pr}$ is equal to $P_{s2}$, and further assuming that the proportioning ratio Pr, which is constant, and is defined as $\Delta P_{s1}$ (out)/$\Delta P_{s1}$ (in), then the general equation for $P_{pr}$ at any inlet pressure is represented:

$$P_{pr} = P_{s1} + P_r (P_I - P_{s1}) \quad (1)$$

The forces acting upon the piston member 104 are as follows. A force equal to $(A_4 \times P_{pr})$ acts upon the piston 104 to bias the same toward the right in FIG. 1. The term $(A_4 \times P_{pr})$ can be rewritten as $A_4 [P_{s1} + P_r (P_I - P_{s1})]$. Additionally, a pressure equal to the difference between the inlet and proportioned pressures, i.e., difference between $P_I$ and $P_{pr}$, acts upon the area $A_3$ to bias the piston 104 toward the right. This force can be written as $A_3 (P_I - P_{pr})$, or as $A_3 \{P_I - [P_{s1} + P_r (P_I - P_{s1})]\}$. The final force acting upon the piston 104 is the spring force $F_s$ which acts in the opposite direction to the first two mentioned forces stated above. In combining all of the forces acting upon the piston member 104 when the piston 104 will be shifted from its position shown in FIG. 1 to the position permitting fluid to flow directly from the inlet passage 34 to the outlet passage 108, the basic equation is as follows:

$$F_s = A_4 P_{pr} + A_3 (P_I - P_{pr}) \quad (2)$$

Prior to point A, the spring force $F_s$ is sufficiently high so that the piston 104 does not move. Subsequent to point A, both $P_I$ and $P_{pr}$ increase in accordance with the relationship depicted by Line II; however, since the difference between $P_I$ and $P_{pr}$ is increasing and acting against $A_3$, and also since $P_{pr}$ is increasing and acting against $A_4$, the resistance of the spring $F_s$ will eventually be overcome, resulting in the piston 104 being unseated, i.e., shifted to the right. This unseating occurs at point B, or when the equation (2) is satisfied. After point B, the proportioning piston 56 will be biased to its downward or closed position since the pressure in the passage 52 will be in excess of the spring force of the spring 58. Accordingly, fluid will cease to pass through the proportioning valve assembly 46. When the piston 104 shifts to the right, a flow path is provided from the counterbore 50 around the cup seal 96 and into the interior of the passage 106, from where the fluid is communicated to the rear brake cylinders 22.

Between points B and C, in FIG. 3, the forces acting on the piston member 104 are as follows: the spring 136 exerts the force $F_s$ upon the member 104 and urges the same toward the left in FIG. 1. This force $F_s$ is opposed by a first rightwardly directed pressure force $P_{pr} (A_2-A_1)$ and by a second rightwardly directed pressure force $A_3 (P_I - P_{pr})$. Accordingly, the following relationship exists for the piston member 136 between points B and C:

$$F_s = A_3 (P_I - P_{pr}) + P_{pr} (A_2-A_1) \quad (3)$$

and at any point along the line IV, this relationship must be satisfied so that the piston member 136 is in equilibrium.

When viewed incrementally, the piston member 136 can be considered to modulate in a step-like manner, since with each incremental increase in the pressure $P_I$ for the master cylinder 12, the term $(P_I - P_{pr})$ in equation (3) will get smaller, which is due to the fact that along line IV, $P_{pr}$ increases at a faster rate than $P_I$. When sufficient pressure has been communicated from the inlet passage 34 to the passage 106, $P_{pr}$ will be equal to $P_I$, at which time the term $P_I - P_{pr}$ will be equal to zero and equation (3) will become:

$$F_s = P_{pr} (A_2-A_1) \quad (4)$$

Equation (4) is the condition or relationship at which line IV, leading from point B to point C, intersects Line I, which is the blend back point and after which time the brake pressure delivered to the front and rear brake systems will again be at a 1:1 ratio.

Figure 2:
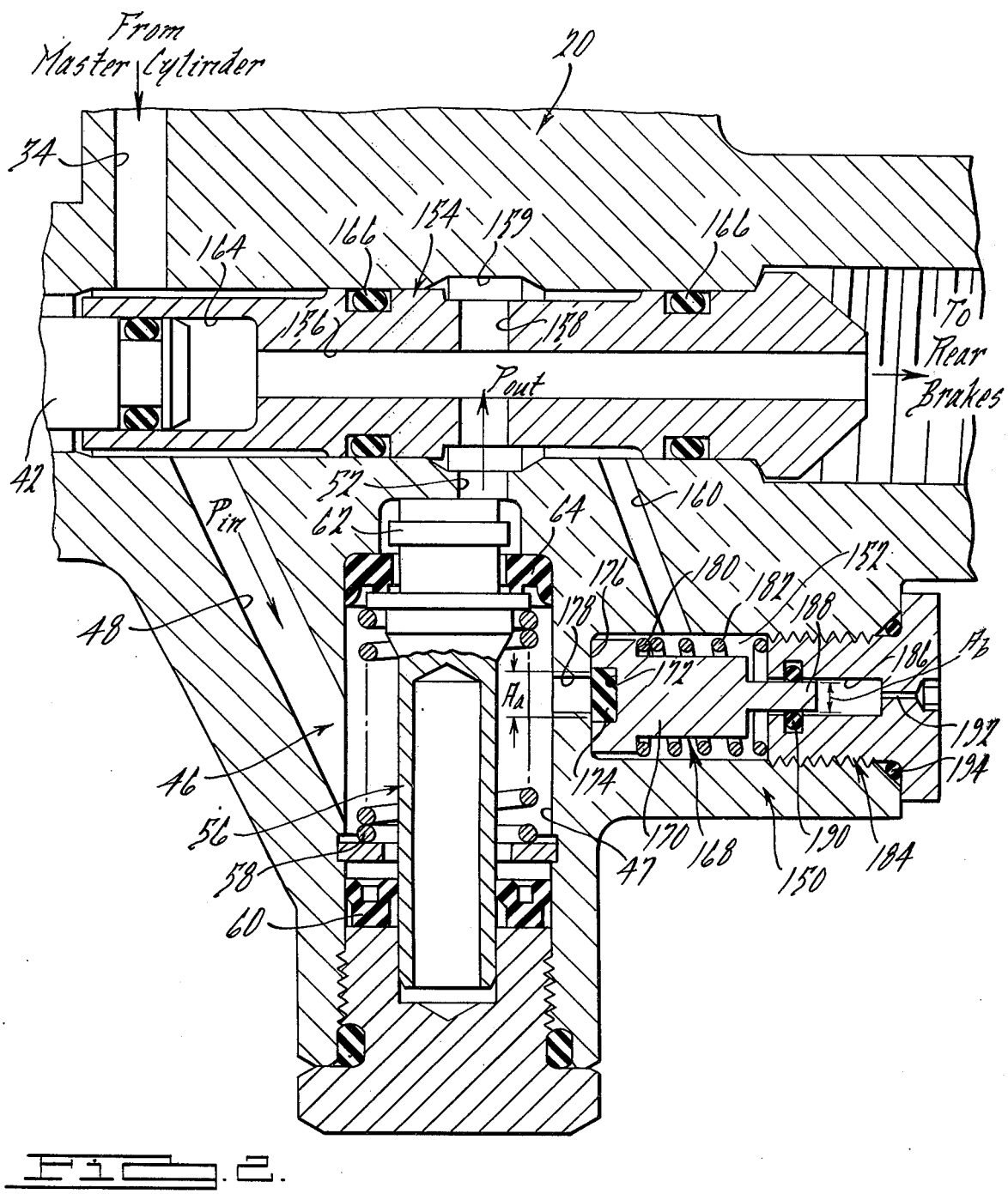
FIG. 2 is a view similar to FIG. 1 and illustrates a slightly modified embodiment of the present invention.

Referring now to FIG. 2, a modified embodiment of the present invention is shown wherein the control device 10 is provided with a valve assembly 150 which is of a slightly different construction than the aforedescribed valve assembly 66, but which generally functions to accomplish the same function as the assembly 66, i.e., of controlling the ratio of the fluid pressures delivered to the front and rear brakes in the manner depicted between the points B and C in the graph of FIG. 3. Generally speaking, the valve assembly 150 is disposed within a bore or chamber 152 located directly to the right of the associated proportioning valve assembly 46. In place of the above described valve assembly 66, the bore 32 is provided with an elongated spool or plug member, generally designated by the numeral 154, and provided with a coextensive longitudinal bore 156. The bore 156 is communicable at one end with the conduits 24 and hence with the rear brakes of the associated vehicle. The spool member 154 is formed with a transverse crossbore 158 which is communicable with an enlarged diameter counterbore 159 formed within the bore 32. The counterbore 159 is in turn communicable with the passage 52 at the outlet of the proportioning valve assembly 36, as above described. The counterbore 159 is also communicable with a downwardly inclined fluid passage 160 formed in the housing 20 and communicable at its lower end with the bore or chamber 152 within which the valve assembly 150 is located. The left end of the spool member 154 is formed with an enlarged diameter counterbore 164 which is analogous to the bore 72 in the aforedescribed spool member 68 and is adapted to accommodate or receive the right end of the piston member 42, as illustrated. Suitable sealing means in the form of o-rings or the like 166 are provided around the outer periphery of the spool member 154 for sealingly engaging the inner periphery of the bore 32, as will be apparent.

The valve assembly 150 includes a cylindrically shaped valve member 168 which comprises a main body section 170 formed with an annular recessed area 172 within the left end thereof. Disposed within the area 172 is a sealing element 174 which is adapted for sealing engagement with a sealing face 176 defined at the left end of the bore or chamber 152. Upon engagement of the sealing element 174 with the face 176, fluid flow through a flow passage 178 communicating the chamber 152 with the chamber 47 is blocked. The valve member 168 is formed with a radial shoulder 180 against which bears one end of a helical coil spring 182.

The spring 182 extends circumjacent the right end of the valve element 168 and has the opposite end thereof bearing against the inner end of a plug or closure member 184 which is threadably received within the outer end of the bore or chamber 152, as illustrated. The plug member 184 is formed with an internal blind bore 186 which is adapted to slidably receive an outwardly projecting stem portion 188 of the valve member 168. An o-ring sealing member 190 is provided interiorly of the blind bore 186 and adapted for sliding sealing engagement with the stem portion 188. The plug 184 is also formed with a vent passage 192 which is adapted to communicate the interior of the blind bore 186 with the atmosphere.

The valve assembly 150 operates in generally the same manner as the aforedescribed valve assembly 66, as does the associated proportioning valve 46. More particularly, the proportioning valve assembly 46 operates to modulate or proportion the fluid from point A to point B in FIG. 3. Assuming that the fluid pressure from the master cylinder is represented as $P_{in}$ and that the proportioned fluid passing from the outlet passage 52 into the bore 156 of the valve assembly 46 is represented as $P_{out}$, the basic equation for the valve assembly 150 is as follows:

$$P_{in}(A_a) = P_{out}(A_a - A_b) + F_s \quad (5)$$

In this equation, $A_a$ is equal to the mean sealing area of the sealing element 174, while the area $A_b$ is equal to the area of the stem portion 188 of the valve member 168 which is exposed to atmosphere (via the passage 192). $F_s$ represents the force of the spring 182. Equation (5) may be rewritten as $(P_{in} - P_{out}) A_a + P_{out}(A_b) = F_s$. Prior to point A, $P_{in}$ is equal to $P_{out}$ and furthermore, the only pressure force acting in opposition to the spring force $F_s$ is $P_{out}(A_b)$. Prior to point A, this pressure force $P_{out}(A_b)$ is less than the spring force $F_s$ and hence equation (5) becomes $P_{out}(A_b) < F_s$. Accordingly, prior to point A, the valve member 168 is biased under the influence of the spring 182 to the left, whereby the sealing element 174 closes the passage 176. As the inlet pressure $P_{in}$ increases, a force opposing the spring force $F_s$ builds up in the amount of $P_{out}(A_b)$ which equals $P_{in}(A_b)$. The force of the spring $F_s$ is sufficiently high so that the valve member 168 remains in the closed position up to point A. After point A, since $P_{in}$ and $P_{out}$ are no longer equal, the equation for the valve member 180 can be represented as:

$$P_{in}(A_a) < P_{out}(A_a - A_b) + F_s \quad (6)$$

Accordingly, as the pressure increases after point A, both $P_{in}$ and $P_{out}$ increase. As will be appreciated, $P_{in}$ tends to bias the valve member 168 toward the right, while $P_{out}$ tends to bias the valve member 168 in concert with the spring 182 toward the left in FIG. 2. The force on the valve member 168 due to the pressure $P_{in}$ increases at a faster rate than the force on the valve member 168 due to the pressure $P_{out}$, and hence there is a net force increase in opposition to the spring 182. Accordingly, a force builds up against the spring 182 and eventually will cause the valve member 168 to shift to the right to open the bore 178, whereupon fluid pressure will pass directly from the chamber 47 to the chamber 152. The unseating or opening of valve member 168 occurs at point B, and the equation for the valve member 168 at point B can be stated as follows:

$$(P_{in} - P_{out}) A_a + P_{out} A_b = F_s \quad (7)$$

After point B, fluid ceases to pass through the proportioning valve assembly 46 which becomes closed, as described in connection with the first embodiment of the control device 10 of the present invention. Accordingly, from point B to point C in FIG. 3, the forces acting on the valve member 168 are as follows: the spring 182 exerts the force $F_s$ against the member 168 and urges the same toward the left in FIG. 2. This force $F_s$ is opposed by a rightwardly directed pressure force $P_{in} A_a$ and is assisted by a pressure force $P_{out}(A_a - A_b)$, with the result that the following relationship exists for the valve member 168 between points B and C in FIG. 3.

$$P_{out} = P_{in} \frac{(A_a)}{A_a - A_b} - \frac{F_s}{A_a - A_b} \quad (8)$$

This can be rewritten as:

$$F_s = P_{in} A_a - P_{out}(A_a - A_b) \quad (9)$$

or:

$$F_s = A_a (P_{in} - P_{out}) + P_{out} A_b \quad (10)$$

At any point along the line IV equation (9) must be satisfied for the valve member 168 to be in equilibrium. As described in connection with the operation of the apparatus shown in FIG. 1, the piston member 168 will modulate in a step-like manner, since with each incremental increase in the pressure $P_{in}$, the term $(P_{in} - P_{out}) A_a$ in equation (10) becomes smaller, since $P_{out}$ increases at a greater rate than $P_{in}$ and eventually $P_{out}$ will equal $P_{in}$ at which time equation (10) will become:

$$F_s = P_{out} A_b \quad (11)$$

This, of course, is the condition or relationship when line IV intersects line I, which is the point of blend back and after which time the brake pressure delivered to the front and rear brake systems will be at a 1:1 ratio.

It will be noted that in both of the embodiments hereinabove described, at such time as a failure occurs in the front brake system, a direct flow path is provided from the inlet passage to the outlet passage, thus assuring that maximum fluid pressure is delivered to the rear brakes to compensate for any reduction in the performance of the front brakes of the vehicle due to either a partial or complete failure thereof.

While it will be apparent that the preferred embodiments illustrated herein are well calculated to fulfill the objects above stated, it will be appreciated that the present invention is susceptible to modification, variation and change without departing from the scope of the invention.

We claim:

1. A device for a dual brake system including a master cylinder and front and rear brake actuators,
    said device being located in said system between said master cylinder and said rear brake actuator and including,
    a housing having a first bore, a fluid inlet adapted to receive fluid from said master cylinder and a fluid outlet through which fluid is adapted to be displaced to said rear brake actuator, said inlet being communicable with one portion of said first bore and said outlet being communicable with another portion of said first bore,
    first valve means actuatable in response to fluid pressure at said inlet in excess of a first predetermined pressure for decreasing the transmission of fluid pressure from said inlet to said outlet,
    said first valve means being disposed in a second bore different from said first bore,
    second valve means having a first area exposed to the fluid pressure at said outlet and a second area different from said first area exposed to the fluid pressure at said inlet and actuatable in response to a predetermined pressure differential between said inlet and said outlet to provide a flow path circumventing said first valve means and permitting fluid to flow directly from said inlet to said outlet, said second valve means being disposed in said first bore and movable longitudinally therein to provide said direct flow path, and bypass means in said first bore for sensing a predetermined pressure condition in an ancillary brake system for providing a direct flow path from said inlet to said outlet and bypassing said first and second valve means.

2. The invention as set forth in claim 1 wherein said first valve means comprises a proportioning valve.

3. The invention as set forth in claim 2 wherein one of said areas of said second valve means is exposed to the outlet pressure from said proportioning valve.

4. The invention as set forth in claim 1 which includes means resiliently biasing said second valve means toward a position blocking said flow path.

5. The invention as set forth in claim 1 wherein said first valve means has a first total area exposed to fluid pressure at said inlet and a second total area exposed to fluid pressure at said outlet, and wherein the ratio of said first and second total areas is established so as to provide movement of said valve means in response to fluid pressure at said inlet.

6. The invention as set forth in claim 5 wherein said second total area is greater than said first total area of said first valve means.

7. The invention as set forth in claim 1 which includes means within said bore resiliently biasing said second valve means toward said inlet.

8. The invention as set forth in claim 1 wherein the larger of said areas is exposed to fluid pressure at said inlet, and wherein a portion of said second valve means is exposed to the atmosphere.

9. The invention as set forth in claim 1 wherein said another portion of said bore is communicable with one side of said first valve means.

10. The invention as set forth in claim 9 which includes spring means resiliently biasing said second valve means toward said portion of said bore communicable with said first valve means.

11. The invention as set forth in claim 1 wherein said first valve means comprises a proportioning valve having a valve member movable along a first axis and wherein said second valve means comprises a valve element movable along an axis different from said first mentioned axis.

12. The invention as set forth in claim 11 wherein the inlet of said second valve means comprises the outlet of said proportioning valve.

13. The invention as set forth in claim 11 wherein the inlet of said second valve means is communicable with the inlet of said proportioning valve.

14. The invention as set forth in claim 1 wherein said first valve means comprises a first proportioning valve and said second valve means comprises a second proportioning valve.

15. The invention as set forth in claim 1 wherein the axis of said second bore is substantially perpendicular to the axis of said central bore.

16. A device for a dual brake system including a master cylinder and front and rear brake actuators, said device being located in said system between said master cylinder and said rear brake actuator and including, a housing having a fluid inlet adapted to receive fluid from said master cylinder and a fluid outlet through which fluid is adapted to be displaced to said rear brake actuator, a first modulating valve assembly having an inlet communicable with said fluid inlet and an outlet communicable with said fluid outlet, said first valve assembly being adapted for movement in response to fluid pressure at said fluid inlet for decreasing the transmission of fluid pressure from said fluid inlet to said fluid outlet, a second modulating valve assembly having a valve member with a first area exposed to the fluid pressure at said outlet of said first valve assembly and a second area exposed to the fluid pressure at the inlet of said first valve assembly, means defining a first flow path from said fluid inlet to the inlet of said first valve assembly and from the outlet of said first valve assembly through said second valve assembly and finally from said second valve assembly to said fluid outlet, said valve member of said second modulating valve assembly being actuatable in response to a predetermined fluid pressure differential between said inlet and outlet of said first valve assembly to provide a second flow path at least partially different from said first flow path for communicating fluid directly from said fluid inlet to said fluid outlet, and bypass means for sensing a predetermined pressure condition in an ancillary brake system for providing a direct flow path from said fluid inlet to said fluid outlet and bypassing said first and second valve assemblies.

17. The invention as set forth in claim 16 wherein said first modulating valve assembly includes differential area means adapted for movement in response to fluid pressure at said fluid inlet for decreasing the transmission of fluid pressure from said fluid inlet to said fluid outlet, and which includes resilient means for applying a force to said differential area means for preventing movement of said differential area means and consequent decreasing the transmission of fluid pressure thereby below a first predetermined fluid level at said fluid inlet, said resilient means yielding to allow movement of said differential area means to decrease the transmission of fluid pressure from said fluid inlet to said fluid outlet above said first predetermined fluid pressure level.

18. The invention as set forth in claim 16 which includes means resiliently biasing said valve member of said second valve assembly toward a position blocking said second flow path.

19. The invention as set forth in claim 16 wherein said housing is formed with a bore, wherein said fluid inlet is communicable with one portion of said bore and said fluid outlet is communicable with another portion of said bore, wherein said second valve assembly is disposed in said bore and is movable longitudinally therein to open and close said second flow path.

20. The invention as set forth in claim 19 which includes means within said bore resiliently biasing said second valve means toward said fluid inlet.

21. The invention as set forth in claim 20 wherein said first valve assembly includes a valve member having first and second areas exposed to said fluid inlet and said fluid outlet and wherein the larger of said areas is exposed to fluid pressure at said outlet.

22. The invention as set forth in claim 16 wherein said housing is formed with a bore, wherein said second valve means is disposed in said bore, and wherein a portion of said bore is communicable with said fluid outlet and another portion of said bore is communicable with one side of said first valve assembly.

23. The invention as set forth in claim 22 which includes spring means resiliently biasing said valve member of said second valve assembly toward said portion of said bore communicable with said first valve assembly.

24. The invention as set forth in claim 23 wherein said first valve assembly comprises a proportioning valve having a valve member movable along a first axis and wherein said valve member of said second valve assembly is movable along an axis different from said first mentioned axis.

25. A device for a dual brake system including a master cylinder and front and rear brake actuators,
   said device being located in said system between said master cylinder and said rear brake actuator and including,
   a housing having a central longitudinal bore and a second bore different from said central bore,
   said housing having a fluid inlet and a fluid outlet, said inlet adapted to receive fluid from said master cylinder and being communicable with one portion of said central bore, and said outlet adapted to displace fluid to said rear brake actuator and being communicable with a second portion of said central bore,
   first proportioning valve means actuatable in response to fluid pressure at said inlet in excess of a first predetermined pressure for decreasing the transmission of fluid pressure from said inlet to said outlet,
   said first proportioning valve means being disposed in said second bore and being movable longitudinally therein,
   second proportioning valve means being disposed in said central bore and being movable longitudinally therein,
   means defining a first flow path from said fluid inlet to the inlet of the first proportioning valve means and from the outlet of said first proportioning valve means through at least part of said second proportioning valve means and finally to said fluid outlet,
   said second proportioning valve means actuatable in response to a predetermined pressure differential between said inlet and said outlet to provide a second flow path at least partially different from said first flow path and circumventing said first proportioning valve means and permitting fluid to flow directly from said inlet to said outlet,
   bypass means for sensing a predetermined pressure condition in an ancillary brake system for providing a direct flow path from said fluid inlet to said fluid outlet and bypassing said first and second proportioning valve means, and
   said bypass means being disposed in said central bore and being movable longitudinally therein in substantial coaxial relationship with said second proportioning valve means.

26. The invention as set forth in claim 25 wherein the axis of said second bore is perpendicular to the axis of said central bore.

27. The invention as set forth in claim 25 which includes means resiliently biasing said second proportioning valve means toward a position blocking said second flow path.

28. The invention as set forth in claim 25 wherein said first proportioning valve means has a first total area exposed to fluid pressure at its inlet and a second total area greater than said first total area exposed to fluid pressure at its outlet, and wherein the ration of said first and second total areas is established so as to provide movement of said first proportioning valve means in response to fluid pressure at its inlet.

29. The invention as set forth in claim 25 which includes means within said central bore resiliently biasing said second proportioning valve means toward said inlet.

30. The invention as set forth in claim 25 wherein said second proportioning valve means has a third total area exposed to fluid pressure at its outlet and a fourth total area larger than said third total area exposed to fluid pressure at its inlet.

31. The invention as set forth in claim 25 wherein the inlet of the second proportioning valve means is communicable with the inlet of the first proportioning valve means.

* * * * *